United States Patent
Malit

(10) Patent No.: US 7,806,626 B2
(45) Date of Patent: Oct. 5, 2010

(54) PAVEMENT MARKING SYSTEM

(76) Inventor: Romeo Fernando Malit, 17920 Alburtis Ave., Artesia, CA (US) 90701

(*) Notice: Subject to any disclaimer, the term of this patent is extended or adjusted under 35 U.S.C. 154(b) by 0 days.

(21) Appl. No.: 12/353,960

(22) Filed: Jan. 14, 2009

(65) Prior Publication Data
US 2009/0154994 A1  Jun. 18, 2009

Related U.S. Application Data

(62) Division of application No. 10/861,734, filed on Jun. 4, 2004, now Pat. No. 7,513,508.

(51) Int. Cl.
*E01C 23/16* (2006.01)
(52) U.S. Cl. .......................... 404/94; 404/93
(58) Field of Classification Search ............ 404/93, 404/94; 239/150
See application file for complete search history.

(56) References Cited

U.S. PATENT DOCUMENTS

| | | | |
|---|---|---|---|
| 4,401,265 A * | 8/1983 | Hofmann | 239/1 |
| 5,642,962 A * | 7/1997 | Marcato | 404/94 |
| 5,947,637 A * | 9/1999 | Neuling | 404/94 |
| 6,149,341 A * | 11/2000 | Nculing | 404/75 |
| 6,247,872 B1 * | 6/2001 | Marcato | 404/94 |
| 6,299,934 B1 * | 10/2001 | Manning | 427/137 |
| 6,330,503 B1 * | 12/2001 | Sharp et al. | 701/50 |
| 6,402,252 B1 * | 6/2002 | Dickson | 299/39.6 |
| 6,505,995 B2 * | 1/2003 | Sanfilippo et al. | 404/94 |
| 6,547,158 B1 * | 4/2003 | Smith | 239/150 |
| 7,121,761 B2 * | 10/2006 | Woodruff | 404/17 |
| 7,294,204 B2 * | 11/2007 | Hong et al. | 118/323 |
| RE40,505 E * | 9/2008 | Murphy | 404/124 |

* cited by examiner

*Primary Examiner*—Raymond W Addie
(74) *Attorney, Agent, or Firm*—Ashok Tankha; IP Legal Services

(57) ABSTRACT

Disclosed herein is a system and method for computer assisted driving of vehicles. The system disclosed herein provides an array of sensors positioned in the vehicles at strategic points for capturing vibrations and sound induced, when the vehicles move over pavement surfaces marked with pre-defined patterns of peaks and troughs. The sensors further measure frequencies of these vibrations. An onboard computer on the vehicle matches the captured frequencies and sound against pre-specified frequencies to obtain unique frequency signatures for the segment of the pavement traversed by the vehicle. Navigational data and geographical data associated with the unique frequency signature are used to provide assistance in driving of vehicles.

6 Claims, 5 Drawing Sheets

PAVEMENT MARKING SYSTEM

CROSS REFERENCE TO RELATED APPLICATIONS

This is a divisional patent application of U.S. patent application Ser. No. 10/861,734, titled "Computer Assisted Driving Of Vehicles", filed on Jun. 4, 2004, now U.S. Pat. No. 7,513,508.

BACKGROUND

This invention generally relates to transportation. More specifically, this invention relates to a system and method for computer-assisted transportation.

Measurements and analyses of measurement data have been used for automated controlling of systems and processes. Different physical quantities such as pressure, strain, load, temperature, etc. are captured through heat, chemical, mechanical, or electrical signals. The signals are captured using different measuring instruments and the captured data provide sets of known values of the physical quantities that is used for analysis and control of systems and processes. Fingerprint recognition systems or biometrics determine the uniqueness of biometric samples. Sensors in a blood pressure machine measure pressure against the wall of the blood vessels. Reading the input data transmitted by the sensors has offered control and guidance, boundary and perimeter technologies. Collision and avoidance system and forward looking devices are in great use in today's cars as well as in global positioning systems (GPS).

U.S. patent number 20020067292 filed Jul. 24, 2001 teaches multi-sensory co-relation of traffic lanes from a digital road coupled with a navigation system and distance resolving sensor. U.S. patent number 20030123930 teaches matrix element magnetic pavement marker having an array of magnetic pavement elements arranged in a predetermined pattern interconnected by a carrier web. The method described in German patent application DE 19906614 a1 teaches a traffic lane detection sensor in the form of a video camera and an object position sensor composed of radar sensor which detects the markings lines at the road edge to the data of a digital map. Japanese publication JP 10325869 teaches the same. German published patent application no. 19507957 proposes a tracking of travel speed regulating device with use of optical sensor by use of lane markings. German published patent no. 4200694 as well as Winner et. al., society of automotive engineers (sae) technical paper series 961010, 1996 (page. 27-36) teaches adaptive cruise control. U.S. patent application no. 20040088079 filed Nov. 14, 2003 discloses methods and device for obstacle detection and distance measurements by infrared. U.S. patent application no. 20030046158 teaches about moving advertising target. U.S. patent application no. 20040049339 teaches an assistance system for selecting a route with the aid of a computing device, a storage device, and i/o device uses route parameters. U.S. Pat. No. 4,030,958 teaches a method for applying adhesive back tapes to a surface. U.S. Dept. of Transportation paper titled "A Preliminary Field Investigation Of UltraViolet-Activated Fluorescent Roadway" dated July/August 1997, vol. 61, no. 1 describes a preliminary field evaluation of ultraviolet-activated fluorescent roadways. When UV light strikes certain materials, the wavelength of the UV light become longer creating light that is visible by combining UV headlight on vehicles and UV-activated fluorescent materials in roadway markings.

Prior technologies may not provide set and forget driving solutions, hands-free operations, or adaptive software for automated assistance in driving of vehicles. German patent application DE 19906614 teaches traffic lane detection in the form of a video camera and object position sensor which detect the marking lines of the road edges and presents the road edges on a digital map. Road edges provide an unreliable gauge for steering the vehicle. German patent application no. 19507957 proposes a regulating device with optical sensors for tracking travel speed using lane markings. The device disclosed in German patent application no. 19507957 provides a method to regulate speed and may not provide navigational information.

BRIEF SUMMARY OF THE INVENTION

An object of the invention is to provide hands-free operation of a motor vehicle that is assisted by a computer for navigation without the manual intervention of the driver.

Another object of the invention is to provide destination procedures that provides route planning options to the driver. The driver may obtain route information to a destination by inputting information about a desired destination.

Another object of the invention is to provide distance predictions between different locations for the commuters.

A further object of the invention is to provide computer-assisted means of driving that automatically adapt to different road conditions by automatic programming.

Yet another object of the invention is to provide applications for wired/wireless computers that operates by communicating with a main control module.

Still yet another object of the invention is to provide interactive road and pedestrian behaviors to the driver of the vehicle by determining changes in road conditions that exist on the travel route of the driver.

Another object of the invention is to alert the driver of hazards ahead by synchronizing with road workers and agencies.

Another object of the invention is to provide medical, fire, or police response that is triggered with any break in continuity of travel.

A further object of the invention is to provide software for different road conditions and updates that may be used by commuters by buying new software for new types of road.

Yet another object of the invention is to provide easy access to nearest hotels, parks, restaurants, etc. by wireless or wired computers.

Yet another object of the invention is to provide a set and forget driving on side streets, with the same invention installed in vehicles for non-chaos crossing.

Another object of the invention is to provide accurate GPS locators that operates by precise mapping of the road.

Another object of the invention is to provide adjustments to shocks and suspensions of the vehicle based on the data of the road conditions.

A further object of the invention is to provide efficient movement of goods and services that operates by locomotive type block of convoy.

Yet another object of the invention is to provide plan ahead commuting that operates by computing the number of commuters on the road.

Still yet another object of the invention is to provide efficient road management that operates by paid consultancy.

Another object of the invention is to provide input to government agencies for better constructions of highway by offering new technologies in road building.

Another object of the invention is to provide interactive advertisements of goods and services by providing interactive display, and by streaming audio-video content onto portable computers used for computer-assisted driving.

Yet another object of the invention is to provide protection for pavements by spraying protective overcoat.

Yet another object of the invention is to provide selectively visible ads, recognitions, acknowledgements printed on the pavements that are visible through ultraviolet or infrared visual devices.

Another object of the invention is to provide safety for commuters by marking pavements with orderly peaks and troughs such that vehicles do not slide off the road.

Another object of the invention is to provide photos, images, identifying marks printed on the highways and roads, that can be conveniently viewed by the driver from the driver's seating position.

In accordance with a preferred embodiment of the invention, disclosed herein is a system and method for computer-assisted transportation, and for marking pavements with peaks and troughs. The system disclosed herein provides peaks and troughs on the pavement surface to induce vibrations in vehicles passing over the pavement surface. An array of sensors are provided on the vehicles to capture and measure these vibrations. The sensors may be vibration transducers positioned strategically on different parts of the vehicles. The sensors capture vibrations of the body of the vehicles when the vehicles move over peaks and troughs on the pavement surfaces. The sensors further measure the frequencies of the vibrations. Sensors independent of each other measure the frequencies of vibrations when the vehicle's tires come in contact with the marked pavement surfaces when driving. The pavement surfaces are identified with unique signatures associated with the marking on the pavement surfaces. The measured frequencies are matched with pre specified frequencies by the on-board computer to determine the particular segment of the road traversed by the vehicle, for steering the vehicle in the appropriate direction consistent with the software loaded in the on-board computer for particular segments of the road, etc. With any deviations in the road, a learning process by the system's proprietary software creates algorithms using robust built-in artificial intelligence capabilities automatically. The system also captures the sounds emitted or created when tires run over the pavements by reading the bounced sounds. The information from the vibration transducers and the sound sensors are processed concurrently, thereby achieving parallel high resolutions of frequencies. By reading the unique signatures, accurate spot locations of places, objects, and people are identified wirelessly by their location address. Vibrations and acoustics sensors may be placed on the axles, or suspensions of the vehicles. Since the sensors are tuned to specific frequencies, the sensors may also be placed inside the vehicles. The on-board computer controls, processes, and analyzes the data coming from the different sensors, and may be installed in the glove compartment, under the seat, trunk or any area for easy servicing. The on-board computer may be interfaced with a personal computer, or any wired/wireless devices.

In accordance with a preferred embodiment of the invention, there is disclosed a system and method for computer-assisted transportation and marking pavements with peaks and troughs. The troughs and peaks on the pavement surface are created using an apparatus made of flat sheet of metal or plastic adjustable to the width of the road being built for marking the cement or asphalt on the road after it has been built. The apparatus comprises two parts. The first part is a smooth finish to flatten the cement, asphalt and other road paving materials. The second part comprises mechanisms for marking the pavements. The apparatus has arrays of openings. These openings comprise a plurality of injection systems. These injection systems may be packaged as one unit or embodied in three different forms. In a first embodiment, the injection system comprises arrays of stamper rods or plungers, and each stamper rod or plunger is placed in a protective housing. The housing comprises return springs on the lower edges. In order to drive the stamper rods/plungers out of the openings for penetrating or stamping the paving materials at a predetermined depth, the injection system may use hydraulic systems, solenoids actuators or air pressure system. The depth of penetration into the paving material represents the unique signature of the road or the pavement. In a second embodiment, the injection system comprises nozzles at the end of the rods/plungers. The nozzles use air to make impressions on the cement, asphalt or other paving materials. Each nozzle comprises hose connections attached to air compressor regulator, which is computer controlled for exact impressions of data. The nozzle heads are interchangeable with printing heads. This may result in a low cost system since it does not need elaborate hydraulic, solenoid, actuator constructions. In a third embodiment, the injection system is a combination of the above two embodiments.

In accordance with a preferred embodiment of the invention, there is disclosed a system and method for printing selectively-visible paint or ink materials on the pavement. Further disclosed is a system of nozzles/heads for spraying paint to create markings on the pavements. Ultraviolet or infrared paint may be used for printing the markings on the pavements. Light waves of ultraviolet and infrared are part of the spectrum that are not visible to the naked eye. After the paint has been printed, ultraviolet or infrared emitter sensor illuminates the printed regions on the pavement surfaces and return signals are captured by ultraviolet or infrared receiver sensor. A laser source or a light emitting diode (LED) may be used.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Disclosed herein is a system and method for computer-assisted transportation by marking pavements with peaks and troughs.

Figure 1:
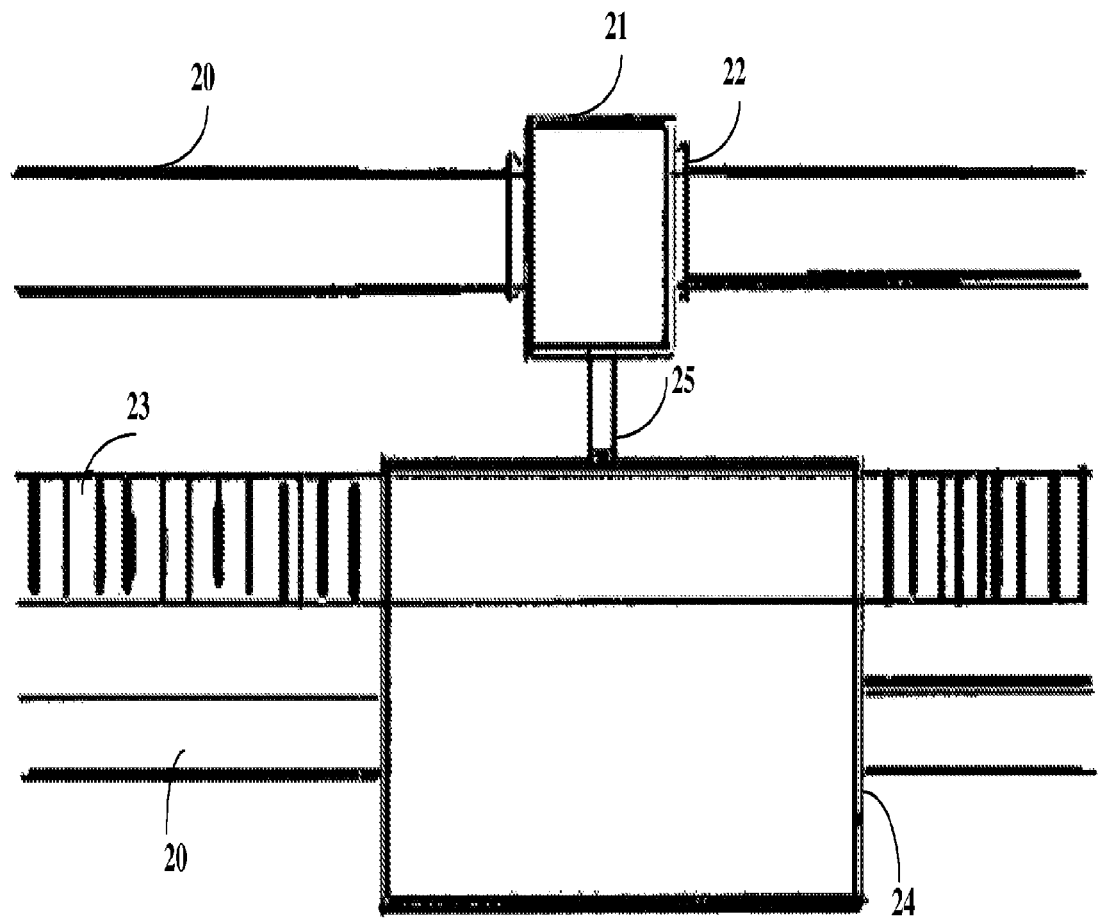
FIG. 1 exemplarily illustrates an apparatus for marking pavements with peaks and troughs.
Figure 2:
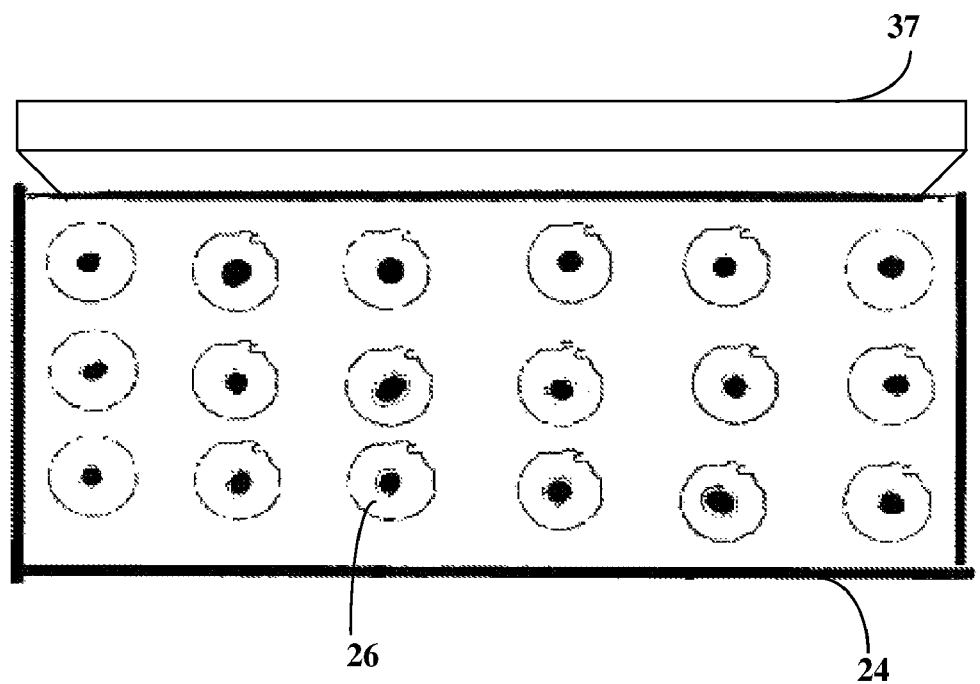
FIG. 2 exemplarily illustrates arrangement of nozzles in the apparatus for marking pavements.
Figure 3:
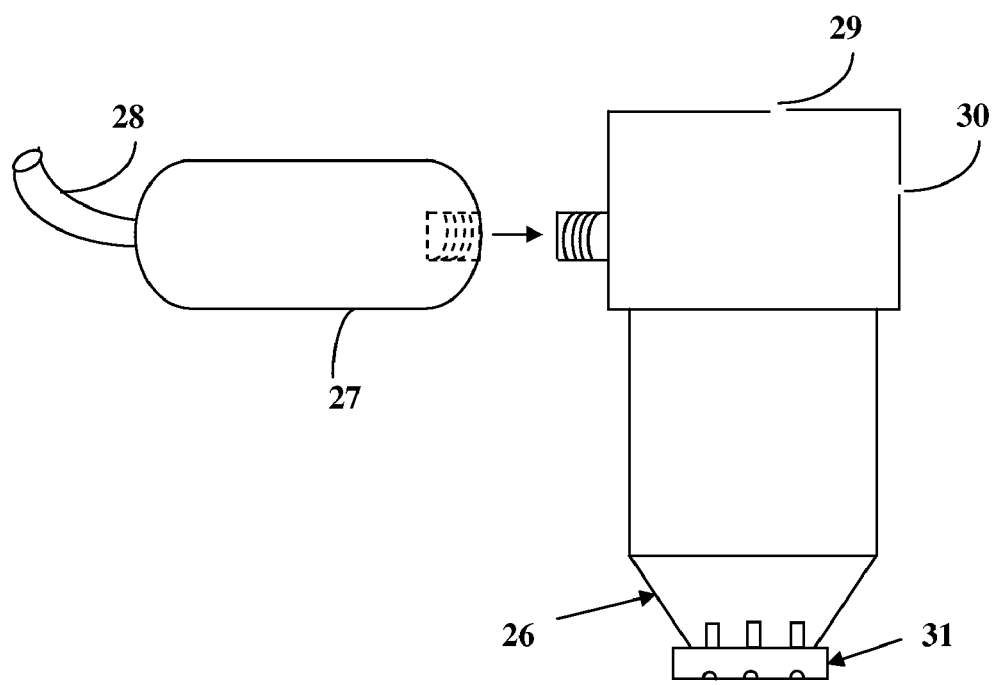
FIG. 3 exemplarily illustrates a nozzle for marking pavements using stamper rods or for printing selectively-visible paint.
Figure 4:
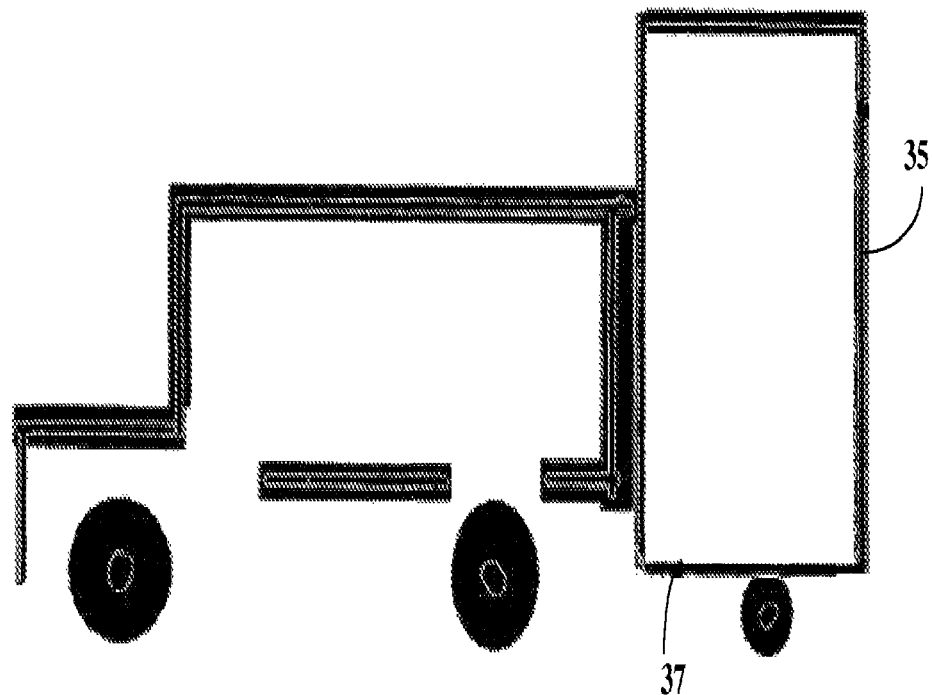
FIG. 4 illustrates an enclosure attached to a truck for housing the apparatus for marking pavements.
Figure 5:
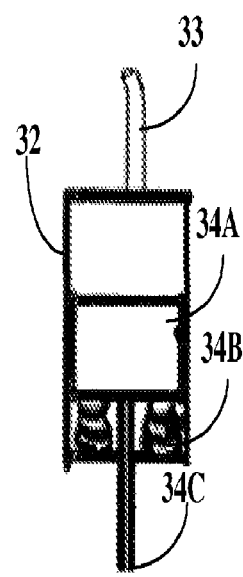
FIG. 5 illustrates a piston type arrangement for stamper rods.
Figure 6:
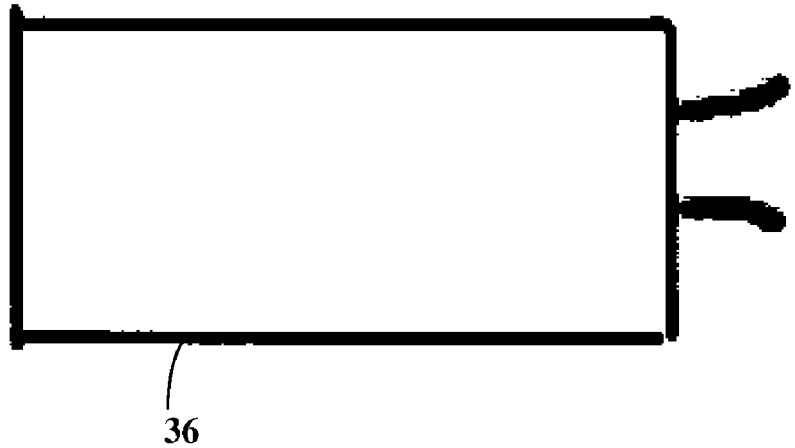
FIG. 6 exemplarily illustrates a sensor for reading vibrations on the body of vehicles.
Figure 7:
FIG. 7 illustrates a flat sheet of metal or plastic for surface finishing of the pavement surfaces.
Figure 8:
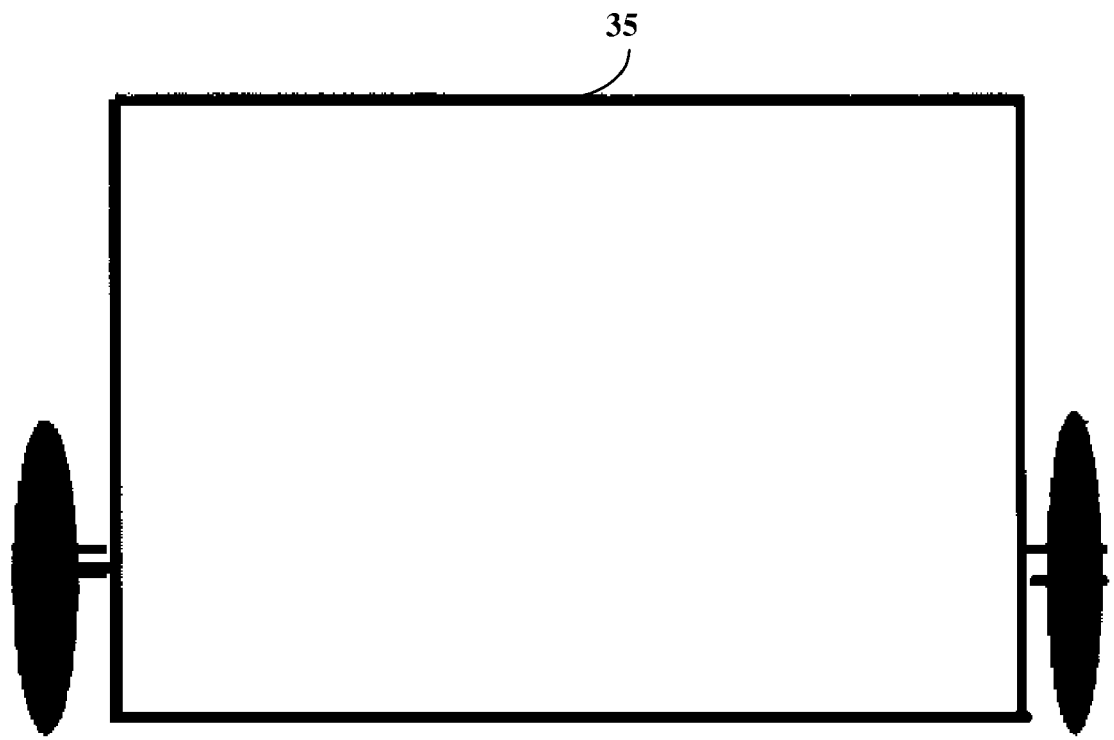
FIG. 8 exemplarily illustrates a trailer type vehicle or platform for housing the apparatus for marking pavements.

Turning first to FIG. 6, there is shown a sensor 36, preferably an array of vibration transducers that is strategically positioned on the body of the vehicles. For maximum vibration pick-up, the sensors may be connected to shocks and springs of the suspensions systems so that the movement of the tires can be effectively captured as they move over the pavement. The sensor wires are connected to computer control modules and/or attached to any portable computer or in this case to a laptop computer wirelessly, for processing captured sensor signals. Following the preferred procedure, deviations in the roads' peaks and troughs direct the computer programs to compute vehicle motion adjustments by the analysis of the unique signatures on the pavements. The on-board computer's proprietary software creates self conditioning algorithms by its built-in artificial intelligence to adapt to deviations in the captured sensor signals due to irregularities caused from debris and clutter on the pavement surfaces. In response to information acquired by the sensors that deviate from the normal, the on-board computer may self-heal/self-learn to adapt to changes temporarily. The on-board computer infers that the captured frequencies by the sensors does not match any frequency values stored in its databank and thereby proceeds with values of frequencies already known. In keeping with one of the principal objects of the invention, the sonic sensors are placed adjacent to each other to capture sounds made by the vibration of the wheels. Laser or LED pick-up may be used to read ultraviolet/infrared printed paint for high resolution over-sampled frequencies. In this way, accurate interactive steering and navigation of the vehicle is achieved. Commuters may have to update or buy new software in CDs, DVDs, Flash Cards, Hard Drive or any storage media suited depending on the road they intend to use. The arrangement of FIG. 1 is housed within the enclosure 35. To accomplish the step of marking the pavements, there is shown in FIG. 1, an electric motor 21, supported by holding brackets with rollers 22 thereby, to keep the electric motor 21 on track to a plurality of long adjustable guide metal bars 20. The parallel guide metal bars 20 are used to support the weight of the electric motor 21, housing 24, the nozzles 26, etc. The bracket 22 has bearings for easy gliding. The electric motor shaft 25 is connected to gears of the metal block housing 24. The metal block housing 24 comprises arrays of openings that comprise a plurality of injections systems 26. Flat smooth finish sheet of metal/plastic 37 in FIG. 7 is positioned as an independent segment to the housing 24. The housing 24 comprises interchangeable assembly from FIG. 5 enclosure 32 to printing heads 31 as described in FIGS. 1 and 2, and may be packaged as one. In carrying out the invention, the electric motor 21 with the housing 24 moves left or right within the enclosure 35 by having the gear in the housing connected by a rack and pinion arrangement 23. In the illustrated embodiment, marking is performed by the stamper rods or by printing selectively-visible paint image on the pavement via nozzles 26 as evident in FIG. 3. In accordance with the invention, FIG. 5 further illustrates an enclosure 32 that houses a piston 34A, return springs 34B and the stamper rods 34C. Hose 33 can be connected to hydraulic solenoids, actuators and air pressure systems to penetrate or stamp the asphalt/cement or materials on the pavement surface at a computerized predetermine depth. In a preferred construction, a printer with any selectively visible ink or paint, for example ultraviolet, infrared ink/paint as the preferred material is used. The ink/paint is stored in a secondary reservoir 27 and connected through hose 28 to the main tank and aperture for the ink/paint to flow to printing head 31. In the present instance, pavements should be free of debris and clutter and ready for printing image/data and for laying long lasting UV/waterproof overcoat protection. The system for marking pavements may be mounted or built in a truck as illustrated in FIG. 4 and protected in an enclosure 35. For small works, the system for marking pavements may be mounted on a trailer type vehicle as illustrated in FIG. 8.

What is claimed is:

1. An apparatus for marking peaks and troughs on a pavement surface for inducing vibrations in a plurality of vehicles passing over said pavement surface, comprising:
    an electric motor supported on a first guide bar attached to an enclosure, wherein said enclosure is attached to a trailer;
    a plurality of holding brackets attached to said electric motor, wherein each of said holding brackets comprise a plurality of rollers for keeping the electric motor on track of said first guide bar, and wherein each of the holding brackets further comprise a plurality bearings for providing gliding support to the electric motor;
    a metal block housing supported on a second guide bar attached parallel to the first guide bar, wherein said metal block comprises:
        a plurality of injection systems for marking said peaks and said troughs on the pavement surface in a pre-defined pattern, wherein each of said injection systems comprise a protective enclosure, and wherein the injection systems are positioned at a plurality of openings provided on the metal block housing;
        a plurality of gears comprising a rack and a pinion, wherein said rack is attached to said trailer parallel to the first and said second guide bars, and wherein said pinion is connected to a shaft of the electric motor for allowing the electric motor to control movement of the metal block housing with respect to said second guide bar;
    a flat sheet attached to said enclosure for providing a flattened finish to a paving material laid on the pavement surface.

2. The apparatus of claim 1, wherein said protective enclosure of each of said injection systems comprises:
    a plurality of stamping rods;
    a piston connected to said stamping rods;
    a plurality of return springs attached to lower edges of each of said protective enclosure for providing return action to the stamping rods connected to said piston; and
    a hose connecting said protective enclosure with one of a plurality of hydraulic solenoids, a plurality of actuators, and an air pressure system for providing motion to said stamping rods through said piston, wherein said hydraulic solenoids, said actuators, and said air pressure system are controlled by a computer for providing a predetermined marking depth to the pavement surface.

3. The apparatus of claim 1, wherein said protective enclosure of each of said injection systems comprises:
    a plurality of stamping rods;
    a nozzle attached to end of each of the stamping rods, wherein said nozzle uses air provided by an air compressor regulator for creating impressions on the pavement surface, and wherein said nozzle comprises:

a nozzle head for marking the pavement surface; and a plurality of hose connections connecting said protective enclosure with said air compressor regulator, wherein said air compressor regulator is controlled by a computerized system for creating exact impressions of data on the pavement surface.

4. The apparatus of claim 3, wherein said nozzle head is interchangeable with a printing head for printing on the pavement surface.

5. The apparatus of claim 4 further comprises a reservoir for storing a paint used for printing on the pavement surface, wherein said paint is transferred through a hose to a main tank for the paint to flow to said interchangeable printing head.

6. The apparatus of claim 5, wherein said paint is one of an ultraviolet paint and an infrared paint.

* * * * *